United States Patent [19]

Gribble et al.

[11] Patent Number: 5,620,015

[45] Date of Patent: Apr. 15, 1997

[54] FLUSH VALVE

[75] Inventors: Donald L. Gribble; Ted A. Gribble, both of Molalla, Oreg.

[73] Assignee: Agpro, Inc., Paris, Tex.

[21] Appl. No.: 534,666

[22] Filed: Sep. 27, 1995

[51] Int. Cl.$^6$ ...................................................... F16K 1/24
[52] U.S. Cl. ........................... 137/1; 251/147; 251/154; 251/228; 251/237; 251/262; 251/284; 251/299; 251/303
[58] Field of Search ................................. 137/1; 251/147, 251/154, 226, 228, 237, 262, 284, 299, 303

[56] References Cited

U.S. PATENT DOCUMENTS

| | | |
|---|---|---|
| 2,699,318 | 1/1955 | Ellison et al. . |
| 2,850,259 | 9/1958 | Larson . |
| 3,119,594 | 1/1964 | Heggem . |
| 3,300,177 | 1/1967 | Topham et al. . |
| 3,654,942 | 4/1972 | Mayer ................................. 251/147 X |
| 3,995,435 | 12/1976 | Waterston ......................... 251/147 X |
| 4,022,421 | 5/1977 | Carlin ................................ 251/303 X |
| 4,770,392 | 9/1988 | Schmidt . |
| 4,785,844 | 11/1988 | Pankov . |
| 4,899,979 | 2/1990 | Stamp . |
| 4,913,398 | 4/1990 | Ziaylek, Jr. et al. . |
| 5,046,408 | 9/1991 | Eugenio ........................ 137/527.6 X |

OTHER PUBLICATIONS

Installation and Maintenance Instructions for SF 12X20 MKII Superflush Valve.

*Primary Examiner*—Gerald A. Michalsky
*Attorney, Agent, or Firm*—Kolisch, Hartwell, Dickinson, McCormack & Heuser

[57] ABSTRACT

A valve for sealing a pipe opening with a seal plate movably attached to the pipe opening and a valve body fixed to the pipe opening. Moving the seal plate towards the pipe opening closes the valve, and moving the seal plate away from the pipe opening opens the valve. The valve body includes a plate stop to limit the movement of the seal plate relative to the pipe opening. For instance, the seal plate, when forced fully away from the pipe opening, is forced to define an oblique plane that is oblique to the plane of the pipe opening. A method of sealing and then unsealing a pipe opening incorporating such a seal plate is also included.

42 Claims, 3 Drawing Sheets

FLUSH VALVE

BACKGROUND OF THE INVENTION

This invention relates generally to flush cleaning of surfaces in which a sheet of water or other fluid is released suddenly to clean a surface such as the floor of a livestock confinement facility. The basic principles of such flush cleaning are discussed in U.S. Pat. No. 3,223,070. It has been found that such flush cleaning works best if the water is released at a pressure in the range of 20- to 50-feet of water column, and if such release is effected through distributed outlets. Accordingly, an elevated water tank or other source of pressurized water is typically connected to various distributed outlets by piping in the range of 12-inches in diameter. Furthermore, in large facilities it is preferable that each outlet be operable independent of all others. Thus, each such outlet is equipped with a valve that is capable of opening the outlet in a rapid fashion, as well as sealing the outlet while the water is gushing from the outlet under the pressures discussed above. Such valves are what are referred to generally herein as flush valves, and are the focus of the present invention.

Some conventional valves might function effectively as flush valves, but are often quite expensive. Furthermore, conventional valves usually provide at least some degree of controllability of the flow rate of the liquid flowing through the valve, controllability that is not necessary for flush valve applications. Accordingly, conventional valves are significantly over-capable for flush valve applications.

Known flush valves include a flat pipe opening that is sealed by a seal plate pressed against the opening from outside the pipe. A simple automatic actuator for such a flush valve includes an air pillow fixed relative to the pipe opening, with the seal plate located between the air pillow and the pipe opening. Inflating the air pillow closes the valve and deflating the air pillow allows the pressure of the water to force the valve open. The plate is held in alignment with the pipe opening by one or more pedestals that slidably interfit with the pipe opening. Furthermore, the pedestals hold the seal plate in a fixed axial alignment with the pipe opening so that the air pillow pushes evenly on the seal plate.

These known flush valves have several drawbacks, including the requirements of a source of compressed air, an interconnection from such a source to the various valves, and the addition of controls at each valve to control the air. Furthermore, such known flush valves are in essence omnidirectional, and do not divert the flow of water exiting the pipe opening in any particular direction.

Flush systems of the type for which the present invention is designed use quantities of water that are sufficiently high to justify recycling the water. Furthermore, they are used in environments in which the water quickly becomes saturated with rather harsh impurities such as cow manure, sand, gravel and other particulates. Accordingly, the recycled water is particularly destructive of mechanical devices such as valves. This leads to a rapid deterioration of the valves, such that any valves requiring precision alignment of parts quickly become non-functional.

SUMMARY OF THE INVENTION

This invention relates to flush valves in which the seal plate is allowed to move relatively freely from its closed position in contact with the pipe opening to its open position. The seal plate is at least partially restrained relative to the axis of the pipe opening so that the movement of the seal plate is generally along the axis of the pipe opening. Thus, the seal plate remains in alignment with the pipe opening as it moves relative to the pipe opening.

In one embodiment of the invention, the movement of the seal plate along the axis of the pipe opening is limited so that the plate is angled relative to the pipe opening when the valve is in its open position. Thus, the seal plate directs the flow of water exiting the pipe opening in a desired direction determined by the orientation of the seal plate relative to the pipe opening.

The seal plate is moved relative to the pipe opening by an actuator. The preferred actuator includes a lever arm that is rotatably attached to the pipe opening about a pivot so that the distal end of the lever arm rotates about the pivot. This rotation moves the distal end toward and away from the pipe opening, depending on the direction of rotation of the lever arm relative to the seal plate and the pipe opening. The distal end of the lever arm is exposed to engage the seal plate, so that rotating the lever arm about the pivot in the appropriate direction forces the distal end against the seal plate, thereby forcing the seal plate into contact with the pipe opening to close the valve. The preferred embodiment also includes a roller bearing attached to the distal end of the lever arm, with the roller bearing reducing the surface friction between the lever arm and the seal plate. Furthermore, the preferred embodiment includes a wear pad interposed the lever arm and the seal plate. The wear pad protects the seal plate from wear as the lever arm acts on the seal plate. Furthermore, the thickness of the wear plate can be selected to insure a proper closure of the valve. This may be necessary to accommodate variations in the fixing of the valve to the pipe opening, as well as variations in the dimensions of the parts of the valve as the valve wears over time.

The lever arm actuator of the preferred embodiment has been found to work particularly well as a manual actuator, with an operating handle being removably attached to the lever arm, preferably in a position that is isolated from the flow of fluid that results when the flush valve is opened. However, the various embodiments of the present invention are also suitable for use with automatic or powered actuators.

It is an object of the invention to seal a pipe opening with a valve that can be made without the need for precision machined parts.

It is a further object of the invention to seal a pipe opening as large as 12-inches in diameter with a valve and actuator that can be manually operated when sealing against a pressure of 20- to 50-feet of water column.

DETAILED DESCRIPTION OF THE PREFERRED EMBODIMENT

Referring to the drawings, a valve of the present invention is shown generally at 10. Valve 10 includes a valve body 12 in the form of a housing having side walls 14, a top 16 and a bottom 18. A circular opening is formed in bottom 18 to which a cylindrical seal ring 20 is attached. Alternatively, valve body 12 can be fixed directly to a pipe, so the pipe opening is in the position of seal ring 20. Accordingly, seal ring 20 is also referred to as pipe opening 20. Pipe opening 20 preferably is substantially planar, thus defining a plane of pipe opening 20, shown as the top or uppermost portion of pipe opening 20, extending into and out of the page in FIGS. 3 and 5–7.

The housing of the valve thus defines an enclosed portion 22 surrounded by side walls 14, top 16 and bottom 18. Enclosed portion 22 has an inlet 24 defined by pipe opening 20, and an outlet 26 framed by the ends of side walls 14, top 16 and bottom 18. In the preferred embodiment, outlet 26 is generally perpendicular to inlet 24.

As best shown in FIGS. 3–7, valve 10 includes an aligner indicated generally at 28, preferably in the form of a pedestal assembly oriented to be non-parallel to the plane of pipe opening 20. Aligner 28 includes a rear pair of pedestals indicated generally at 30, and a front pair of pedestals indicated generally at 32. The front pair of pedestals 32 defines a slot 32a between pedestals 32.

Pedestals 30 and 32 can be constructed simply out of a threaded bolt. In the preferred embodiment, each front pedestal 32 is encompassed by a sleeve 34. Furthermore, a landing pad 36 is provided at the lower portion of each front pedestal 32, preferably in the form of a washer.

Valve 10 includes a seal plate 38 that is an assembly made up of a flat support plate 40 attached to which are other components, described below. Seal plate 38 is sized to be large enough to obstruct, and thereby seal, pipe opening 20. That portion of seal plate 38 that conforms to pipe opening 20 is referred to as a sealing portion 42. Sealing portion 42 defines an area with a centroid indicated at 42a. That portion of seal plate 38 that lies outside of sealing portion 42 is referred to generally as a flange portion 44. Flange portion 44 includes one or more holes 46 that are oversized relative to rear pedestals 30. Flange portion 44 also includes a tongue 48 that fits within slot 32a.

Seal plate 38 further includes a seal 50, preferably made of a compressible material such as neoprene. Seal 50 is preferably at least as large as sealing portion 42. Seal 50 is attached to flat support plate 40 by a seal retainer plate 52.

Seal plate 38 also preferably includes a wear pad 54 attached to flat support 40 so that flat support 40 is sandwiched between wear pad 54 and seal 50. Wear pad 54 is parallel to and adjacent seal plate 38 when wear pad 54 is so attached to seal plate 38, as shown in FIGS. 3 and 5–7. Wear pad 54 is T-shaped, with attachment tabs or ears 56 and an extension 58 defining the top and body of the T. For reference, the thickness of wear pad 54 is indicated generally by dimensional arrow 60.

Valve 10 includes one or more plate stops, indicated generally at 62, that limit the movement of seal plate 38 relative to pipe opening 20. One such plate stop 62 is a close-stop 64, preferably formed by landing pads 36. Another such plate stop 62 is an open-stop 66 generally defined by top 16 of the housing of valve body 12. In the preferred embodiment, open-stop 66 includes a rear stop 68 in the form of a pair of spacers, each spacer slideably mounted to one of rear pedestals 30. In this embodiment, open-stop 66 further includes a front stop 70, formed by that part of top 16 adjacent front pedestals 32.

The opening and closing of valve 10 is controlled by an actuator 72, with the manual version of the actuator being shown in the drawings. Actuator 72 includes a lever arm 74 with a pivot 76 fixed to valve body 12. Pivot 76 can be a simple spindle about which lever arm 74 rotates. The end of lever arm 74 is referred to as a distal end 78, and is exposed so that distal end 78 can operate on seal plate 38. In the preferred embodiment, distal end 78 includes a roller bearing 80 rollably mounted on lever arm 74 to engage seal plate 38.

Figure 1:
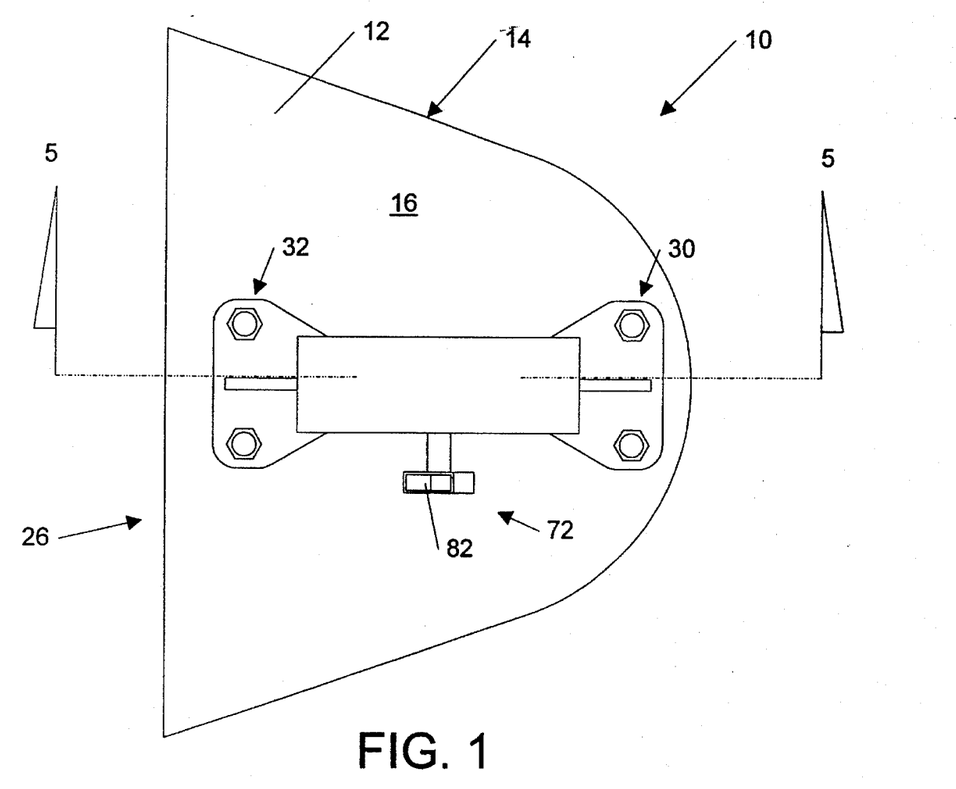
FIG. 1 is a top plan view of the present invention.
Figure 2:
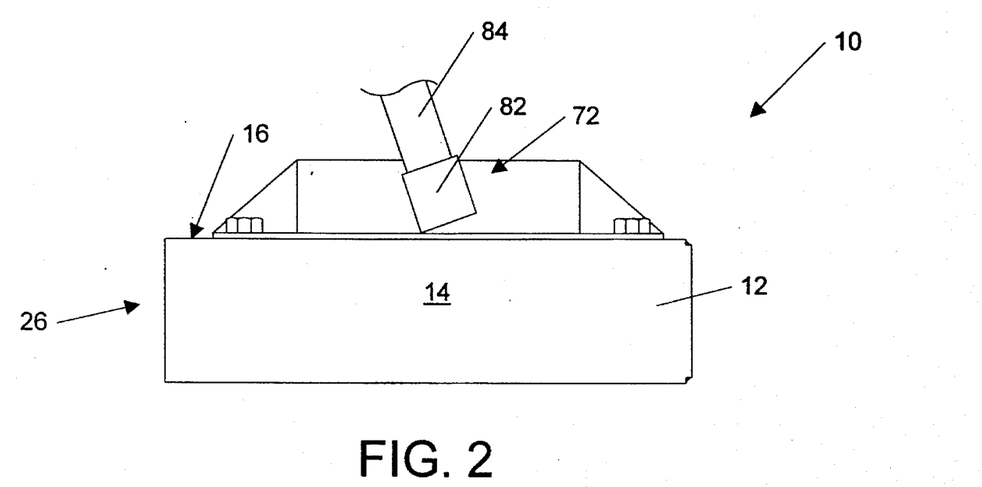
FIG. 2 is a side plan view of the valve shown in FIG. 1, shown with a removable operating handle inserted into a handle receiver of the valve, shown on about the same scale as FIG. 1.
Figure 3:
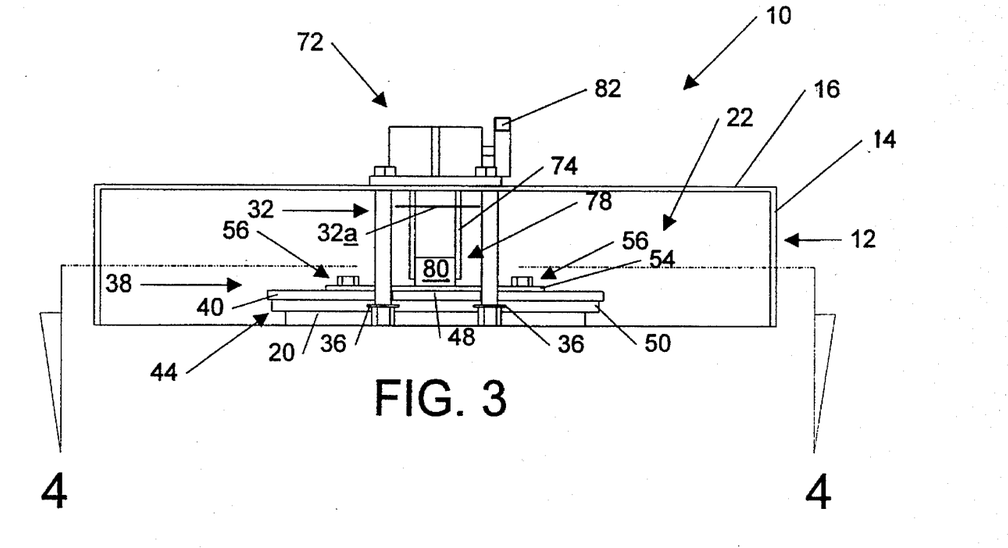
FIG. 3 is a front plan view of the flush valve shown in FIG. 1, shown on about the same scale as FIGS. 1 and 2.

A handle receiver 82 can be fixed to lever arm 74, and a removable operating handle 84 can be inserted into receiver 82, as shown in FIG. 2. Rotating handle 84 thus rotates lever arm 74. Alternatively, an automatic actuator, not shown, could be operatively connected to either lever arm 74 or seal plate 38 to achieve the results described both above and below.

Figure 5:
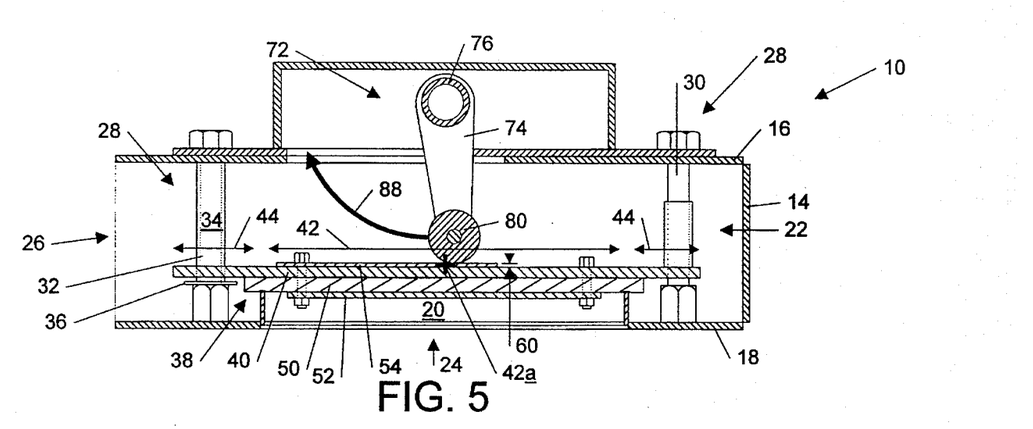
FIG. 5 is an enlarged cross-sectional view of the valve shown in FIG. 1, taken along line 5—5 in FIG. 1.
Figure 6:
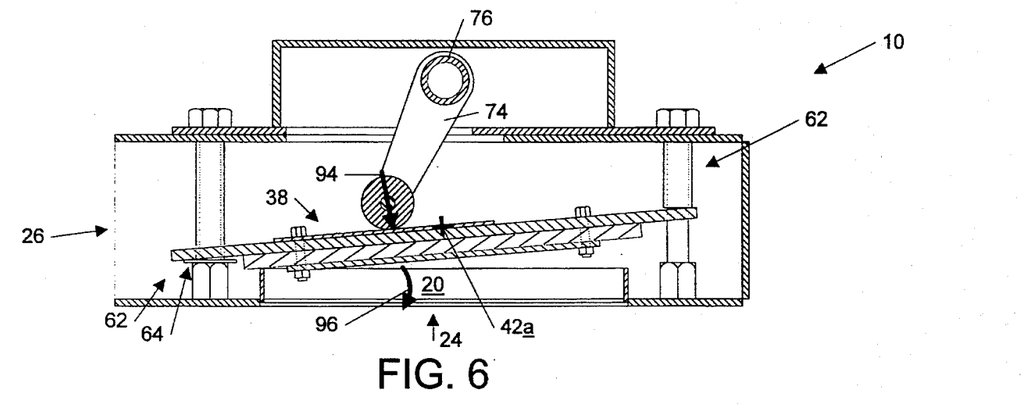
FIG. 6 is a cross-sectional view of the valve shown in FIG. 5, with the lever partially rotated clockwise about the pivot, and the seal plate of the valve shown as it would be if water were pressing against the seal plate to partly open the valve.
Figure 7:
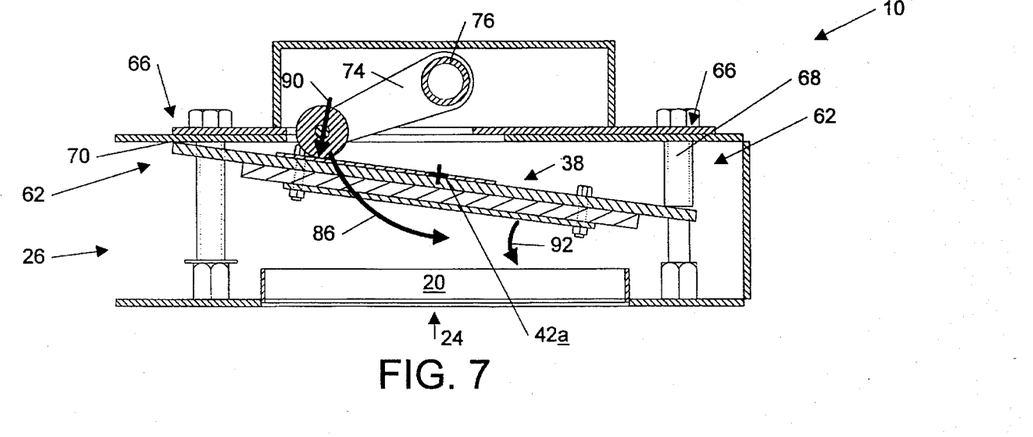
FIG. 7 is a cross-sectional view of the valve shown in FIG. 6, with the lever further rotated clockwise about the pivot so that the valve is in its fully open position.

For reference, a first direction of rotation of lever arm 72 is indicated by arrow 86 in FIG. 7, and a second direction of lever arm 74 is indicated by arrow 88 in FIG. 5. An open-stop-pivoting force is indicated by arrow 90 in FIG. 7, creating an open-stop-pivoting movement generally as shown by arrow 92 in FIG. 7. Similarly, a close-stop-pivoting force is indicated by arrow 94 in FIG. 6, creating a close-stop-pivoting movement indicated by arrow 96.

From the forgoing identification of the component parts of the present invention, numerous interrelationships of these parts are encompassed by the invention. For example, the invention includes a valve 10 for sealing a substantially planar pipe opening 20. Valve 10 includes a seal plate 38 movably attached to pipe opening 20 so that moving seal plate 38 towards pipe opening 20 closes valve 10 by obstructing pipe opening 20. Furthermore, moving seal plate 38 away from pipe opening 20 opens valve 10.

Valve 10 also includes a valve body 12 fixed relative to pipe opening 20. Valve body 12 in turn includes a plate stop 62 to limit the movement of seal plate 38 relative to pipe opening 20 so that seal plate 38, when forced fully away from pipe opening 20, defines an oblique plane that is oblique to the plane of pipe opening 20. This oblique plane is represented in FIG. 5 by seal plate 38, and extends into and out of the page. The plane of pipe opening 20 is shown as the top or uppermost portion of pipe opening 20. Seal plate 38 is shown in a closed position in FIG. 5, and in an open position in FIG. 7, and defines an oblique angle between the open position of FIG. 7 and the closed position of FIG. 5. The oblique angling of seal plate 38 directs the flow of water leaving pipe opening 20, preferably towards outlet 26 to provide less piping losses in the valve, thereby resulting in a faster stream of water leaving the valve.

The above-described valve 10 preferably includes a pedestal, such as pedestals 30 or 32, slidably operative between pipe opening 20 and seal plate 38 to keep seal plate 38 aligned with pipe opening 20. Specifically, seal plate 38 slides along the longitudinal axis of each of pedestals 30 and 32, as shown best in FIGS. 5–7. Furthermore, a spacer 68 is preferably operative between seal plate 38 and plate stop 62 to limit the movement of seal plate 38 relative to plate stop 62. This limitation of the movement of seal plate 38 defines the oblique plane referred above.

The pedestal is preferably fixed relative to pipe opening 20, and can be used either with or without a spacer interposed seal plate 38 and valve body 12. If a spacer is included, it has been found to be best to use a spacer that can be mounted on the pedestal, such as the sliding tubular spacer 68 shown in FIGS. 3–7. Spacer 68 is preferably slidably mounted on the pedestal so that spacer 68 moves along the pedestal in conjunction with seal plate 38 moving along the pedestal. Alternatively, spacer 68 could be fixed to the upper portion of the pedestal, or formed as part of top 16.

The preferred embodiment of valve 10 further includes a second plate stop placed outside of pipe opening 20 and operative between seal plate 38 and pipe opening 20 to limit the movement of seal plate 38 relative to pipe opening 20 so that seal plate 38, when forced toward pipe opening 20, is forced against the second plate stop, as shown in FIG. 6, prior to being forced against pipe opening 20, as shown in FIG. 5. This allows seal plate 38 to be in contact with substantially all of pipe opening 20 prior to the exertion of substantial force directly between seal plate 38 and pipe opening 20.

In the preferred embodiment, valve 10 further includes a second pedestal distant from the first pedestal. This second pedestal is slidably operative between pipe opening 20 and seal plate 38 to further maintain the orientation of seal plate 38 relative to pipe opening 20. If the first pedestal is one of pedestals 30, the second pedestal is either the other pedestal 30, or preferably one of pedestals 32. This valve 10 can further include a third pedestal distant from the first pedestal. If the second pedestal is viewed as being one of pedestals 32, the third pedestal is the other of pedestals 32. Second and third pedestals 32 are fixed relative to pipe opening 20 to define a plate-receiving slot 32a between second and third pedestals 32. Seal plate 38 includes a tongue 48 extending outwardly from seal plate 38 so that tongue 48 slides within plate-receiving slot 32a to further maintain the orientation of seal plate 38 relative to pipe opening 20.

Valve 10 can also be described as including a seal plate 38 movably attached to a pipe opening 20 so that moving seal plate 38 towards pipe opening 20 closes the valve, as shown in FIG. 5, and moving seal plate 38 away from pipe opening 20 opens the valve as shown in FIG. 7. This closing and opening is controlled by an actuator 72. Actuator 72 includes a lever arm 74 having a pivot 76 and a distal end 78. Lever arm 74 is rotatably attached to pipe opening 20 about pivot 76 so that rotating lever arm 74 about pivot 76 in a first direction 86 moves distal end 78 toward pipe opening 20, progressing from the position shown in FIG. 7 to that shown in FIG. 5. Rotating lever arm 74 about pivot 76 in a second direction 88 moves distal end 78 away from pipe opening 20, progressing from the position shown in FIG. 5 to that shown in FIG. 7. Directions 86 and 88 are preferably opposites of each other, so that actuator 72 is stable when in a closed position because lever arm 74 is past center with respect to the force exerted on seal plate 38. However, it is also possible to have lever arm 74 rotate in a half- or full-arc, with the position of lever arm 74 shown in FIG. 5 being maintained by a locking mechanism, not shown.

Actuator 72 preferably includes a roller bearing 80 attached to distal end 78 of lever arm 74. Roller bearing 80 is exposed to rollably engage seal plate 38, so that rotating lever arm 74 about pivot 76 in first direction 86 forces roller bearing 80 against seal plate 38, thereby forcing seal plate 38 into contact with pipe opening 20 to close valve 10, as shown in FIG. 5. Rotating lever arm 74 about pivot 76 in second direction 88 releases roller bearing 80 from seal plate 38, thereby allowing seal plate 38 to move away from pipe opening 20 to open valve 10, as shown in FIGS. 6 and 7.

A wear pad 54 is preferably interposed seal plate 38 and roller bearing 80 so that wear pad 54 protects seal plate 38 from wear. Wear pad 54 is ideally of a thickness 60 selected to create the desired force between distal end 78 and seal plate 38 when lever arm 74 is fully rotated in first direction 86, as shown in FIG. 7. This selection of thickness 60 of wear pad 54 allows for adjustment of the closeability of valve 10 to accommodate differences in fixing valve body 12 to pipe opening 20 and to accommodate wear and tear of valve 10.

Figure 4:
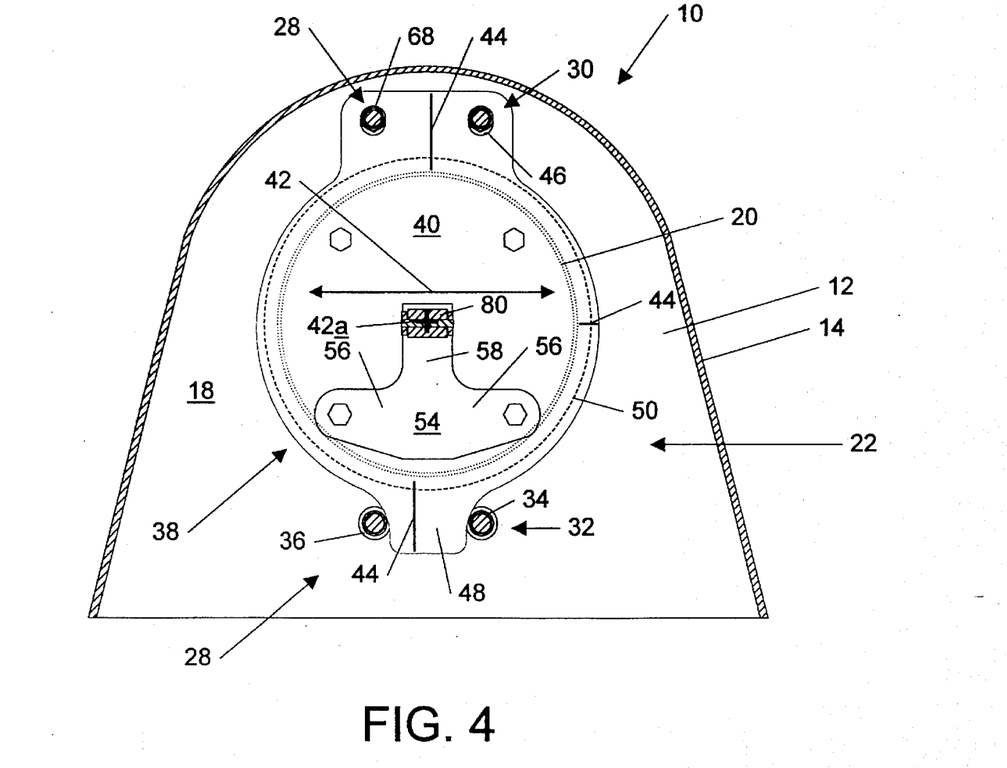
FIG. 4 is a top-sectional view of the valve shown in FIG. 1, taken along line 4—4 in FIG. 3 and shown on about the same scale as FIGS. 1–3.

Valve 10 can also be described as including a seal plate 38 having a sealing region 42 at least as large as pipe opening 20 and a flange 44 extending outwardly from sealing region 42. An aligner 28 slidably interconnects seal plate 38 to pipe opening 20 so that the sealing region 42 is kept in approximate alignment with pipe opening 20. Thus, sliding seal plate 38 towards pipe opening 20 to obstruct the pipe opening closes the valve, as shown in FIG. 5. This also places flange 44 in an outwardly extending position relative to pipe opening 20, as is best seen in FIG. 4. Sliding seal plate 38 away from pipe opening 20 opens the valve, as shown in FIGS. 6 and 7. A close-stop 64 is placed relative to pipe opening 20 and aligner 28 so that close-stop 64 is aligned with flange 44 when valve 10 is closed, as shown in FIGS. 4 and 5.

Valve 10 also includes a lever arm 74 having a pivot 76 and an exposed distal end 78. Lever arm 74 is rotatably attached to pipe opening 20 about pivot 76 so that rotating lever arm 74 about pivot 76 forces distal end 78 against seal plate 38, thereby forcing flange 44 against close-stop 64 as shown in FIG. 6. Further rotation of lever arm 74 pivots seal plate 38 about close-stop 64 to place sealing region 42 into contact with pipe opening 20, as shown in FIG. 7, to close valve 10. Seal plate 38 preferably includes a hole 46 formed outside of sealing region 42 and aligner 28 preferably includes a pedestal 30 that extends through hole 46, as shown in FIGS. 4–7.

Viewed still differently, the invention includes a method of sealing and then unsealing a pipe opening 20. The method includes the steps of providing a close-stop 64, an open-stop 66 and a seal plate 38 having a sealing region 42 at least as large as pipe opening 20 and a flange 44 extending outwardly from sealing region 42. Sealing region 42 defines an area with a centroid 42a. The method further includes the steps of placing close-stop 64 to one side of pipe opening 20 and placing seal plate 38 into contact with open-stop 66 and about aligned with the pipe opening, as shown in FIG. 7.

Another step of the method includes applying an open-stop-pivoting force 86 to seal plate 38, acting primarily on seal plate 38 between centroid 42a and flange 44. This forces flange 44 into contact with close-stop 64 as shown in FIG. 6, by pivoting seal plate 38 about open-stop 66 toward pipe opening 20, as represented by arrow 92. Yet another step includes applying a close-stop-pivoting force 94 to seal plate 38 acting primarily on sealing region 42 to force sealing region 42 into contact with pipe opening 20, as shown in FIG. 5, by pivoting seal plate 38 about close-stop 64 toward pipe opening 20, as represented by arrow 96. This seals pipe opening 20. Allowing seal plate 38 to move away from pipe opening 20 and into contact with open-stop 66 thus progressing from the position shown in FIG. 5 to that shown in FIG. 7, unseals pipe opening 20.

The step of applying open-stop-pivoting force 90 to seal plate 38 preferably includes the use of a lever arm 74 as described above so that open-stop-pivoting force 90 is applied to seal plate 38 through lever arm 74 by way of distal end 78 contacting the seal plate 38 at a region between flange 44 and centroid 42a, as shown in FIGS. 7 and 6. Furthermore, the step of applying close-stop-pivoting force 94 to the seal plate 38 includes the use of a lever arm 74 so that close-stop-pivoting force 94 is applied to seal plate 38 through the lever arm by way of the distal end contacting the seal plate at a region at least partly between flange 44 and centroid 42a, as shown in FIGS. 6 and 5.

Numerous other combinations and subcombinations of the components and steps described above are also possible. Furthermore, while specific embodiments of the invention have been disclosed, variations and modifications are possible without departing from the spirit and scope of the invention.

We claim:

1. A valve for sealing a substantially planar pipe opening, the valve comprising:

a seal plate movably attached to the pipe opening so that moving the seal plate towards the pipe opening closes the valve, and moving the seal plate away from the pipe opening opens the valve;

a pedestal slidably operative between the pipe opening and the seal plate to keep the seal plate aligned with the pipe opening, wherein the pedestal has a longitudinal axis that is nonparallel to the plane of the pipe opening and the seal plate slides along the longitudinal axis of the pedestal; and a valve body fixed relative to the pipe opening, the valve body including a plate stop to limit the movement of the seal plate relative to the pipe opening so that the seal plate, when forced fully away from the pipe opening, defines an oblique plane that is oblique to a plane that is defined by the pipe opening.

2. The valve according to claim 1, further comprising a spacer operative between the seal plate and the plate stop to limit the movement of the seal plate relative to the plate stop, thereby defining the oblique plane.

3. The valve according to claim 1, wherein the pedestal is fixed relative to the pipe opening.

4. The valve according to claim 1, wherein the plate stop includes a spacer interposed the seal plate and the valve body to limit the movement of the seal plate relative the valve body, thereby defining the oblique plane.

5. The valve according to claim 4, wherein the spacer is mounted on the pedestal.

6. The valve according to claim 4, wherein the spacer is slidably mounted on the pedestal so that the spacer moves along the pedestal in conjunction with the seal plate moving along the pedestal.

7. The valve according to claim 1, wherein the pedestal is fixed relative to the seal plate.

8. A valve for sealing a substantially planar pipe opening, the valve comprising:

a seal plate movably attached to the pipe opening so that moving the seal plate towards the pipe opening closes the valve, and moving the seal plate away from the pipe opening opens the valve;

a valve body fixed relative to the pipe opening, the valve body including a plate stop to limit the movement of the seal plate relative to the pipe opening so that the seal plate, when forced fully away from the pipe opening, defines an oblique plane that is oblique to a plane defined by the pipe opening;

a first pedestal slidably operative between the pipe opening and the seal plate to keep the seal plate aligned with the pipe opening; and a second pedestal distant from the first pedestal, the second pedestal slidably operative between the pipe opening and the seal plate to further maintain the orientation of the seal plate relative to the pipe opening.

9. The valve according to claim 8, further comprising a third pedestal distant from the first pedestal, wherein:

the second pedestal and the third pedestal are fixed relative to the pipe opening to define a plate-receiving slot between the second pedestal and the third pedestal;

the seal plate includes a tongue extending outwardly from the seal plate; and the tongue slides within the plate-receiving slot to further maintain the orientation of the seal plate relative to the pipe opening.

10. A valve for sealing a substantially planar pipe opening, the valve comprising:

a seal plate movably attached to the pipe opening so that moving the seal plate towards the pipe opening closes the valve, and moving the seal plate away from the pipe opening opens the valve;

a pedestal slidably operative between the pipe opening and the seal plate to keep the seal plate aligned with the pipe opening, wherein the pedestal is nonparallel to the plane of the pipe opening;

a valve body fixed relative to the pipe opening, the valve body including a plate stop to limit the movement of the seal plate relative to the pipe opening so that the seal plate, when forced fully away from the pipe opening, defines an oblique plane that is oblique to a plane that is defined by the pipe opening; and a lever arm having a pivot and a distal end, wherein:

the lever arm is rotatably attached to the valve body about the pivot so that rotating the lever arm about the pivot in a first direction moves the distal end toward the pipe opening, and rotating the lever arm about the pivot in a second direction moves the distal end away from the pipe opening;

the distal end of the lever arm is exposed to engage the seal plate;

rotating the lever arm about the pivot in the first direction forces the distal end against the seal plate, thereby forcing the seal plate into contact with the pipe opening to close the valve; and rotating the lever arm about the pivot in the second direction releases the distal end from the seal plate, thereby allowing the seal plate to move away from the pipe opening to open the valve.

11. The valve according to claim 10, further comprising a roller bearing attached to the distal end of the lever arm and exposed to rollably engage the seal plate.

12. The valve according to claim 10, further comprising a wear pad interposed the seal plate and the lever arm so that the wear pad protects the seal plate from wear.

13. A valve for sealing a substantially planar pipe opening, the valve comprising:

a seal plate movably attached to the pipe opening so that moving the seal plate towards the pipe opening closes the valve, and moving the seal plate away from the pipe opening opens the valve;

a valve body fixed relative to the pipe opening, the valve body including a plate stop to limit the movement of the seal plate relative to the pipe opening so that the seal plate, when forced fully away from the pipe opening, defines an oblique plane that is oblique to a plane defined by the pipe opening; and a lever arm having a pivot and a distal end, wherein:
the lever arm is rotatably attached to the valve body about the pivot so that rotating the lever arm about the pivot in a first direction moves the distal end toward the pipe opening, and rotating the lever arm about the pivot in a second direction moves the distal end away from the pipe opening;
the distal end of the lever arm is exposed to engage the seal plate;
rotating the lever arm about the pivot in the first direction forces the distal end against the seal plate, thereby forcing the seal plate into contact with the pipe opening to close the valve; and
rotating the lever arm about the pivot in the second direction releases the distal end from the seal plate, thereby allowing the seal plate to move away from the pipe opening to open the valve.

14. The valve according to claim 13, wherein the distal end of the lever arm includes a roller bearing that is exposed to rollably interact with the seal plate.

15. The valve according to claim 14, further comprising a wear pad interposed the seal plate and the lever arm so that the wear pad protects the seal plate from wear.

16. The valve according to claim 15, wherein the wear pad is of a thickness selected to create the desired force between the distal end and the seal plate when the lever arm is fully rotated in the first direction, thereby allowing adjustment of the closeability of the valve to accommodate for differences in fixing the valve body to the pipe opening and for wear and tear of the valve.

17. The valve according to claim 13, further comprising a wear pad interposed the seal plate and the lever arm so that the wear pad protects the seal plate from wear.

18. A valve for sealing a substantially planar pipe opening, the valve comprising:
a seal plate movably attached to the pipe opening so that moving the seal plate towards the pipe opening closes the valve, and moving the seal plate away from the pipe opening opens the valve;
a valve body fixed relative to the pipe opening, the valve body including a plate stop to limit the movement of the seal plate relative to the pipe opening so that the seal plate, when forced fully away from the pipe opening, defines an oblique plane that is oblique to a plane defined by the pipe opening; and
a second plate stop placed outside of the pipe opening and operative between the seal plate and the pipe opening to limit the movement of the seal plate relative to the pipe opening so that the seal plate, when forced toward the pipe opening, is forced against the second plate stop prior to being forced against the pipe opening, thereby allowing the seal plate to be in contact with substantially all of the pipe opening prior to the exertion of substantial force directly between the seal plate and the pipe opening.

19. A valve for sealing a pipe opening, the valve comprising:
a seal plate movably attached to the pipe opening so that moving the seal plate towards the pipe opening closes the valve, and moving the seal plate away from the pipe opening opens the valve;

a lever arm having a pivot and a distal end, the lever arm rotatably attached to the pipe opening about the pivot so that rotating the lever arm about the pivot in a first direction moves the distal end toward the pipe opening, and rotating the lever arm about the pivot in a second direction moves the distal end away from the pipe opening;

a roller bearing attached to the distal end of the lever arm and exposed to rollably engage the seal plate, wherein rotating the lever arm about the pivot in the first direction forces the roller bearing against the seal plate, thereby forcing the seal plate into contact with the pipe opening to close the valve, and wherein rotating the lever arm about the pivot in the second direction releases the roller bearing from the seal plate, thereby allowing the seal plate to move away from the pipe opening to open the valve; and a wear pad attached to the seal plate and interposed the seal plate and the roller bearing so that the wear pad protects the seal plate from wear.

20. The valve according to claim 19, wherein the wear pad is of a thickness selected to create the desired force between the roller bearing and the seal plate when the lever arm is fully rotated in the first direction, thereby allowing adjustment of the closeability of the valve to accommodate differences in fixing the valve body to the pipe opening and to accommodate wear and tear of the valve.

21. The valve according to claim 19, further comprising a valve body fixed relative to the pipe opening, the valve body including a plate stop to limit the movement of the seal plate relative to the pipe opening.

22. A valve for sealing a pipe opening, the valve comprising:
a seal plate movably attached to the pipe opening so that moving the seal plate towards the pipe opening closes the valve, and moving the seal plate away from the pipe opening opens the valve;
a lever arm having a pivot and a distal end, the lever arm rotatably attached to the pipe opening about the pivot so that rotating the lever arm about the pivot in a first direction moves the distal end toward the pipe opening, and rotating the lever arm about the pivot in a second direction moves the distal end away from the pipe opening;
a roller bearing attached to the distal end of the lever arm and exposed to rollably engage the seal plate, wherein rotating the lever arm about the pivot in the first direction forces the roller bearing against the seal plate, thereby forcing the seal plate into contact with the pipe opening to close the valve, and wherein rotating the lever arm about the pivot in the second direction releases the roller bearing from the seal plate, thereby allowing the seal plate to move away from the pipe opening to open the valve; and
a plate stop operative between the seal plate and the pipe opening to limit the movement of the seal plate relative to the pipe opening so that the seal plate, when forced fully away from the pipe opening into an open position, defines an oblique angle between the open and closed positions.

23. The valve according to claim 22, further comprising a pedestal slidably operative between the pipe opening and the seal plate to keep the seal plate aligned with the pipe opening.

24. The valve according to claim 23, wherein the pedestal is fixed relative to the pipe opening.

25. The valve according to claim 23, wherein the plate stop includes a spacer mounted on the pedestal.

26. The valve according to claim 23, wherein the plate stop includes a spacer slidably mounted on the pedestal so that the spacer moves along the pedestal in conjunction with the seal plate moving along the pedestal.

27. The valve according to claim 23, further comprising a second pedestal distant from the first pedestal, the second pedestal slidably operative between the pipe opening and the seal plate to further maintain the orientation of the seal plate relative to the pipe opening.

28. The valve according to claim 22, further comprising a second plate stop placed outside of the pipe opening and operative between the seal plate and the pipe opening to limit the movement of the seal plate relative to the pipe opening so that the seal plate, when forced toward the pipe opening, is forced against the second plate stop prior to being forced against the pipe opening, thereby allowing the seal plate to be in contact with substantially all of the pipe opening prior to the exertion of substantial force directly between the seal plate and the pipe opening.

29. A valve for sealing a pipe opening, the valve comprising:
- a seal plate movably attached to the pipe opening so that moving the seal plate towards the pipe opening closes the valve, and moving the seal plate away from the pipe opening opens the valve;
- a lever arm having a pivot and a distal end, the lever arm rotatably attached to the pipe opening about the pivot so that rotating the lever arm about the pivot in a first direction moves the distal end toward the pipe opening, and rotating the lever arm about the pivot in a second direction moves the distal end away from the pipe opening; and
- a roller bearing attached to the distal end of the lever arm and exposed to rollably engage the seal plate, wherein rotating the lever arm about the pivot in the first direction forces the roller bearing against the seal plate, thereby forcing the seal plate into contact with the pipe opening to close the valve, and wherein rotating the lever arm about the pivot in the second direction releases the roller bearing from the seal plate, thereby allowing the seal plate to move away from the pipe opening to open the valve; and
- a pedestal slidably operative between the pipe opening and the seal plate to keep the seal plate aligned with the pipe opening, wherein the pedestal is nonparallel to a plane defined by the pipe opening.

30. The valve according to claim 29, further comprising a second pedestal distant from the first pedestal, the second pedestal slidably operative between the pipe opening and the seal plate to further maintain the orientation of the seal plate relative to the pipe opening.

31. The valve according to claim 30, further comprising a third pedestal distant from the first pedestal, wherein:
- the second pedestal and the third pedestal are fixed relative to the pipe opening to define a plate-receiving slot between the second pedestal and the third pedestal;
- the seal plate includes a tongue extending outwardly from the seal plate; and
- the tongue slides within the plate-receiving slot to further maintain the orientation of the seal plate relative to the pipe opening.

32. A valve for sealing a pipe opening, the valve comprising:
- a seal plate movably attached to the pipe opening so that moving the seal plate towards the pipe opening closes the valve, and moving the seal plate away from the pipe opening opens the valve;
- a lever arm having a pivot and a distal end, the lever arm rotatably attached to the pipe opening about the pivot so that rotating the lever arm about the pivot in a first direction moves the distal end toward the pipe opening, and rotating the lever arm about the pivot in a second direction moves the distal end away from the pipe opening; and
- a roller bearing attached to the distal end of the lever arm and exposed to rollably engage the seal plate, wherein rotating the lever arm about the pivot in the first direction forces the roller bearing against the seal plate, thereby forcing the seal plate into a closed position in contact with the pipe opening to close the valve, and wherein rotating the lever arm about the pivot in the second direction releases the roller bearing from the seal plate, thereby allowing the seal plate to move away from the pipe opening to open the valve;
- a valve body fixed relative to the pipe opening, the valve body including a plate stop to limit the movement of the seal plate relative to the pipe opening; and
- a spacer operative between the seal plate and the valve body to limit the movement of the seal plate relative to the pipe opening so that the seal plate, when forced fully away from the pipe opening into an open position, defines an oblique angle between the open and closed positions.

33. The valve according to claim 32, wherein the spacer is movably mounted relative to the valve body so that the spacer moves in conjunction with the seal plate.

34. A valve for sealing a pipe opening, the valve comprising:
- a seal plate movably attached to the pipe opening so that moving the seal plate towards the pipe opening closes the valve, and moving the seal plate away from the pipe opening opens the valve;
- a lever arm having a pivot and a distal end, the lever arm rotatably attached to the pipe opening about the pivot and the distal end operatively connected to the seal plate so that rotating the lever arm about the pivot in a first direction moves the distal end toward the pipe opening and forces the seal plate into contact with the pipe opening to close the valve, and rotating the lever arm about the pivot in a second direction moves the distal end away from the pipe opening and allows the seal plate to move away from the pipe opening to open the valve; and
- a wear pad attached to the seal plate so that the wear pad is parallel to and adjacent the seal plate, and interposed the seal plate and the lever arm so that the wear pad protects the seal plate from wear.

35. The valve according to claim 34, wherein the wear pad is of a thickness selected to create the desired force between the distal end and the seal plate when the lever arm is fully rotated in the first direction, thereby allowing adjustment of the closeability of the valve to accommodate differences in fixing the valve body to the pipe opening and to accommodate wear and tear of the valve.

36. A method of sealing and then unsealing a pipe opening, comprising the steps of:
- providing a close-stop;
- providing an open-stop;
- providing a seal plate having a sealing region at least as large as the pipe opening and a flange extending outwardly from the sealing region, the sealing region of the seal plate defining an area with a centroid;

placing the close-stop to one side of the pipe opening;

placing the seal plate into contact with the open-stop and about aligned with the pipe opening;

applying an open-stop-pivoting force to the seal plate acting primarily on the seal plate between the centroid of the sealing region and the flange to force the flange into contact with the close-stop by pivoting the seal plate about the open-stop toward the pipe opening;

applying a close-stop-pivoting force to the seal plate acting primarily on the sealing region to force the sealing region into contact with the pipe opening by pivoting the seal plate about the close-stop toward the pipe opening, thereby sealing the pipe opening; and allowing the seal plate to move away from the pipe opening and into contact with the open-stop, thereby unsealing the pipe opening.

37. The method of sealing and then unsealing a pipe opening according to claim 36, wherein the step of applying the open-stop-pivoting force to the seal plate includes the use of a lever arm rotatably fixed to the pipe opening, the lever arm having a distal end that rotates about the pivot, and the open-stop-pivoting force is applied to the seal plate through the lever arm by way of the distal end contacting the seal plate at a region between the flange and the centroid of the sealing region.

38. The method of sealing and then unsealing a pipe opening according to claim 36, wherein the step of applying the close-stop-pivoting force to the seal plate includes the use of a lever arm rotatably fixed to the pipe opening, the lever arm having a distal end that rotates about the pivot, and the close-stop-pivoting force is applied to the seal plate through the lever arm by way of the distal end contacting the seal plate at a region at least partly between the flange and the centroid of the sealing region.

39. A valve for sealing a pipe opening, the valve comprising:

a seal plate having a sealing region at least as large as the pipe opening and a flange extending outwardly from the sealing region;

an aligner slidably interconnecting the seal plate to the pipe opening so that:
  the sealing region of the seal plate is kept in approximate alignment with the pipe opening;
  sliding the seal plate towards the pipe opening to obstruct the pipe opening closes the valve and places the flange in an outwardly extending position relative to the pipe opening; and
  sliding the seal plate away from the pipe opening opens the valve;

a close-stop placed relative to the pipe opening and the aligner so that the close-stop is aligned with the flange when the valve is closed; and a lever arm having a pivot and an exposed distal end, the lever arm rotatably attached to the pipe opening about the pivot so that rotating the lever arm about the pivot forces the distal end against the seal plate, thereby forcing the flange against the close-stop and pivoting the seal plate about the close-stop to place the sealing region of the seal plate into contact with the pipe opening to close the valve.

40. The valve according to claim 39, wherein the distal end of the lever arm includes a roller bearing exposed for contact with the seal plate.

41. The valve according to claim 39, wherein the aligner includes a pedestal.

42. The valve according to claim 39, wherein the seal plate includes a hole formed outside of the sealing region and the aligner includes a pedestal that extends through the hole.

* * * * *